United States Patent
Chae

(10) Patent No.: US 11,218,803 B2
(45) Date of Patent: Jan. 4, 2022

(54) DEVICE AND METHOD OF PERFORMING AUTOMATIC AUDIO FOCUSING ON MULTIPLE OBJECTS

(71) Applicant: LG ELECTRONICS INC., Seoul (KR)

(72) Inventor: Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/824,628

(22) Filed: Mar. 19, 2020

(65) Prior Publication Data

US 2021/0127205 A1   Apr. 29, 2021

(30) Foreign Application Priority Data

Oct. 23, 2019   (KR) .......................... 10-2019-0132342

(51) Int. Cl.
| | |
|---|---|
| *H04R 3/00* | (2006.01) |
| *G10L 17/26* | (2013.01) |
| *G02B 27/01* | (2006.01) |

(52) U.S. Cl.
CPC ......... *H04R 3/005* (2013.01); *G02B 27/0172* (2013.01); *G10L 17/26* (2013.01); *H04R 2201/401* (2013.01)

(58) Field of Classification Search
CPC .............. H04R 3/005; H04R 2201/401; G02B 27/0172; G10L 17/26
USPC ....................................... 381/56, 58, 92, 365
See application file for complete search history.

(56) References Cited

U.S. PATENT DOCUMENTS

| 10,397,659 | B1* | 8/2019 | Ling | ................... H04N 21/4334 |
| 10,659,848 | B1* | 5/2020 | Baughman | ......... G06K 9/00369 |
| 2013/0342731 | A1* | 12/2013 | Lee | ................... H04N 5/232127 |
| | | | | 348/231.4 |
| 2020/0322544 | A1* | 10/2020 | Jung | ..................... H04N 5/2258 |

* cited by examiner

*Primary Examiner* — William A Jerez Lora
(74) *Attorney, Agent, or Firm* — Lee Hong Degerman Kang & Waimey

(57) ABSTRACT

The present disclosure relates to a device and method of providing audio focusing on multiple objects of interest, the method includes: capturing a video: displaying the video on the display unit; obtaining multiple objects of interest from the video on the basis of a user's input; setting importance of each of the multiple objects of interest; obtaining location information of each of the multiple objects of interest; and allocating audio focusing to the multiple objects of interest on the basis of the importance and the location information of each of the multiple objects of interest, whereby it is possible to provide audio focusing on multiple objects of interest during the video capturing of the electronic device, thereby improving the satisfaction with the video capturing result.

16 Claims, 10 Drawing Sheets

10  31  33  20

DEVICE AND METHOD OF PERFORMING AUTOMATIC AUDIO FOCUSING ON MULTIPLE OBJECTS

CROSS REFERENCE TO RELATED APPLICATIONS

Pursuant to 35 U.S.C. § 119(a), this application claims the benefit of earlier filing date and right of priority to Korean Patent Application No. 10-2019-0132342 filed Oct. 23, 2019, the contents of which are all hereby incorporated by reference herein in their entirety.

BACKGROUND

Modern electronic devices have microphones for obtaining sounds while simultaneously capturing video using a camera. In general, a microphone obtains a variety of surrounding sounds that acts as noise along with the desired sound. Accordingly, in order to increase the satisfaction of a user, an audio focusing technique for obtaining only a desired sound is required.

Recently, products related to audio focusing have been produced, but so far, the audio focusing has been performed only in a direction in which there is a single object selected manually or in association with image adjustment.

SUMMARY

The present disclosure relates generally to a device and method of providing automatic audio focusing on multiple objects of interest.

There may be multiple objects of interest in video capturing of an electronic device, but current devices have limitations in providing satisfactory videos because they are unable to perform audio focusing on the multiple objects of interest.

Various embodiments of the present disclosure may provide an electronic device and a method capable of performing audio focusing on multiple objects of interests.

In addition, various embodiments of the present disclosure may provide an electronic device having a user interface capable of performing audio focusing on multiple objects of interests.

Also, various embodiments of the present disclosure may provide an electronic device and a method capable of allocating audio focusing to each of multiple objects of interest.

The technical problem to be achieved in this disclosure is not limited to the technical problem mentioned above, and other technical problems not mentioned above may be clearly understood by those skilled in the art from the following description.

According to various embodiments of the present disclosure, a device comprises a camera configured to capture a video, a microphone array composed of multiple microphones, a display configured to display the captured video; an input unit configured to receive inputs; and at least one processor configured to cause the display to display the captured video, obtain objects of interest from the captured video based on an input received through the input unit, set an importance value corresponding to at least one object of interest from among the obtained objects of interest, wherein the importance value prioritizes objects of interest, obtain location information of the at least one object of interest and distribute audio focusing to the at least one object of interest based on the set importance value and the obtained location information.

According to various embodiment of the present disclosure, a method of operating a device comprises capturing a video, displaying the captured video on the display, obtaining objects of interest from the captured video based on an input; setting an importance value corresponding to at least one object of interest from among the obtained objects of interest, wherein the importance value prioritizes objects of interest, obtaining location information of the at least one object of interest and distributing audio focusing to the at least one object of interest based on the set importance value and the obtained location information.

According to various embodiments of the present disclosure, the electronic device may provide a user interface for receiving multiple objects of interests and the importance of each object, and may allocate audio focusing to each of the multiple objects of interest according to the importance and/or the location.

According to various embodiments of the present disclosure, audio focusing may be provided to multiple objects of interest in video capturing of an electronic device, so that video capturing results may be satisfactorily provided.

Effects obtained in the present disclosure are not limited to the above-mentioned effects, and other effects not mentioned above may be clearly understood by those skilled in the art from the following description.

BRIEF DESCRIPTION OF THE DRAWINGS

In connection with the description of the drawings, the same or similar reference numerals may be used for the same or similar components.

DETAILED DESCRIPTION OF THE INVENTION

Figure 1:
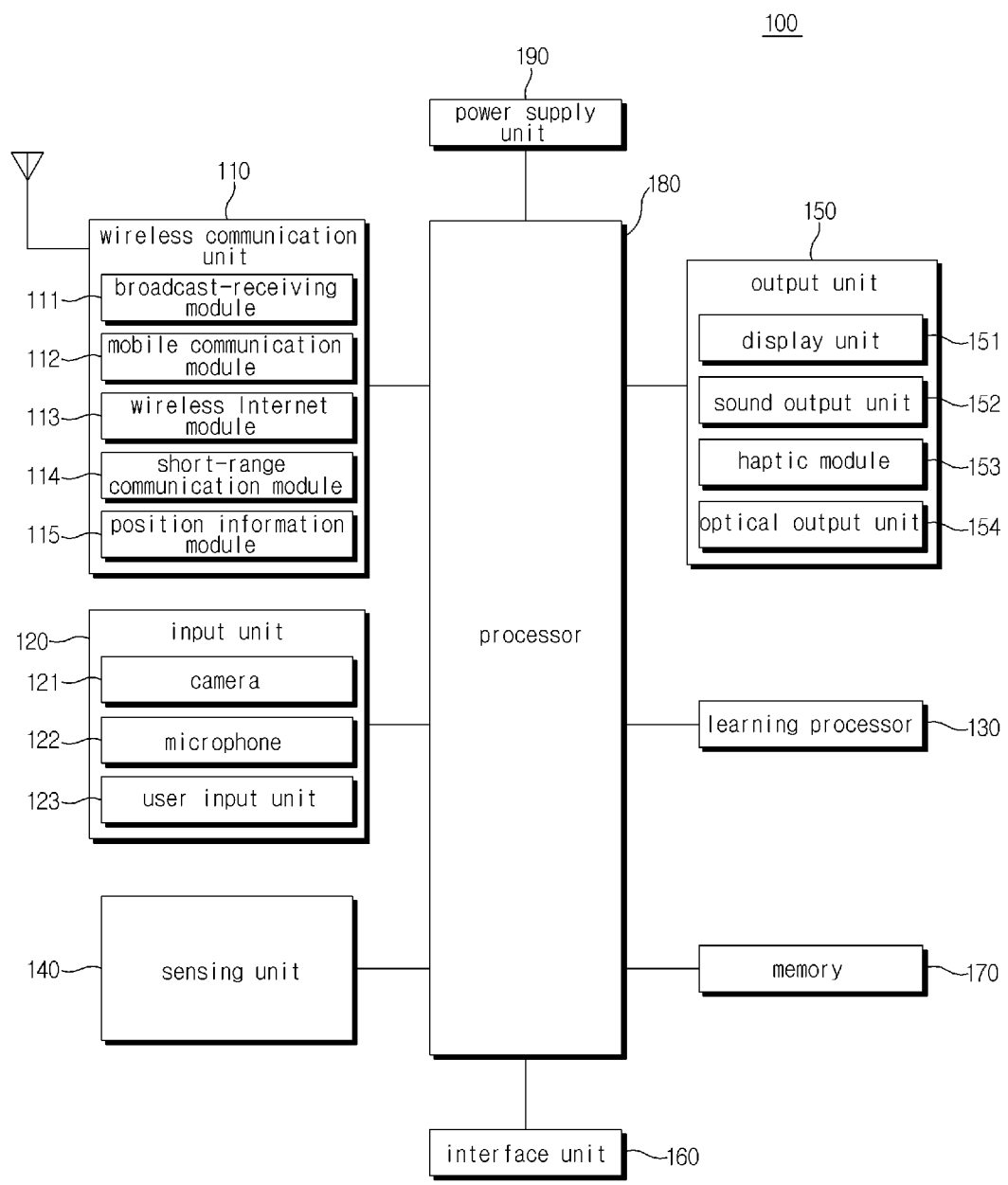
FIG. 1 is a block diagram illustrating an electronic device capable of performing audio focusing on multiple objects according to various embodiments of the present disclosure.

Hereinafter, embodiments of the present disclosure will be described in detail with reference to the accompanying drawings, in which the same or similar components will be given the same reference numerals, and redundant description thereof will be omitted.

The suffixes "module" or "unit" for components used in the following description are given or mixed in consideration of ease of specification, and do not have distinct meanings or roles. In addition, "module" or "unit" means a hardware component such as software or a field programmable gate array (FPGA) or an application specific integrated circuit (ASIC), and the "unit" or "module" performs certain roles. However, "unit" or "module" is not limited to software or hardware. The "unit" or "module" may be configured to be positioned in an addressable storage medium or may be configured to regenerate one or more processors. Thus, as an example, the "unit" or "module" may include components such as software components, object-oriented software components, class components, and task components, processes, functions, properties, procedures, subroutines, segments of program code, drivers, firmware, microcode, circuitry, data, databases, data structures, tables, arrays, and variables. Functions provided within components and "unit" or "modules" may be separated into smaller numbers of components and "units" or "modules" or integrated into additional components and "unit" or "modules".

The steps of a method or algorithm described in connection with some embodiments of the present disclosure may be embodied directly in hardware module, software module, or a combination thereof, executed by a processor. The software module may reside in RAM memory, flash memory, ROM memory, EPROM memory, EEPROM memory, registers, hard disk, removable disk, CD-ROM, or any other type of recording medium known in the art. An exemplary recording medium is coupled to the processor, which can read information from and write information to the storage medium. In the alternative, the recording medium may be integral to the processor. The processor and the recording medium may reside in an application specific integrated circuit (ASIC). The ASIC may reside in a user terminal.

In the following description of the embodiments disclosed herein, if it is determined that the detailed description of the related known technology may obscure the gist of the embodiments disclosed herein, the detailed description thereof will be omitted. In addition, since the accompanying drawings are intended to facilitate understanding of the embodiments disclosed herein, it should be understood that the technical scope disclosed in the present specification is not limited by the accompanying drawings and includes all changes, equivalents, and substitutes included in the spirit and scope of the present disclosure.

Terms including ordinal numbers such as first and second may be used to describe various components, but the components are not limited by the terms. The terms are used only for the purpose of distinguishing one component from another.

When it is said that a component is "connected" or "coupled" to other component, the component may be directly connected to or coupled to that other component, but it should be understood that another component may exist with between them. On the other hand, when it is said that a component is "directly connected" or "directly coupled" to other component, it should be understood that no another component may exist between them.

Audio focusing described below may be also referred to as audio zooming, in which, in order to allow the speech of a specific object to be emphatically obtained than the speech of other surrounding objects, the audio focusing is defined as a technique of focusing the direction of the microphone array on the specific object.

In addition, allocating of audio focusing may be defined as a technique in which speech of multiple objects of interest are emphatically obtained more than speech of other surrounding objects, by dividing the degree of focusing the direction of the microphone array on each object of interest.

FIG. 1 is a block diagram illustrating an electronic device 100 for performing automatic audio focusing according to various embodiments of the present disclosure.

The electronic device 100 illustrated in FIG. 1 is mobile electronic devices such as a mobile phone, a smart phone, a laptop computer, an artificial intelligence device for digital broadcasting, a personal digital assistant (PDA), a portable multimedia player (PMP), navigation, and a slate PC, tablet PC, an Ultrabook, a wearable device (e.g., a smartwatch, smart glasses, a head mounted display (HMD)), and the like, or a fixed electronic device such as a refrigerator, a washing machine, a smart TV, a desktop computer, a digital signage, and the like. In addition, the electronic device 100 may be a fixed or movable robot.

According to an embodiment of a configuration of the electronic device 100 illustrated in FIG. 1, each component may be configured with one chip, component, or electronic circuit, or may be configured with a combination of chips, components, or electronic circuits. According to another embodiment, some of the components shown in FIG. 1 may be separated into several components and may be configured with different chips, components, or electronic circuits; or several components may be combined to form a single chip, component, or electronic circuit. In addition, according to another embodiment, some of the components shown in FIG. 1 may be deleted or components not shown in FIG. 1 may be added. For example, in the case of a desktop computer, the wireless communication unit 110 shown in FIG. 1 may be deleted, and a wired communication unit including Ethernet and/or a LAN may be added.

Referring to FIG. 1, the electronic device 100 according to various embodiments of the present disclosure may include a wireless communication unit 110, an input unit 120, a learning processor 130, a sensing unit 140, an output unit 150, and an interface unit 160, a memory 170, a processor 180, and a power supply 190.

According to various embodiments of the present disclosure, the wireless communication unit 110 may include at least one of a broadcast receiving module 111, a mobile communication module 112, a wireless internet module 113, a local area communication module 114, and a location information module 115.

The broadcast receiving module 111 may receive a broadcast signal and/or broadcast related information from an external broadcast management server through a broadcast channel.

The mobile communication module 112 may transmit and receive a radio signal for data communication with at least one of a base station, an external terminal, a server on a mobile communication network built according to technical standards or communication schemes for mobile communication (e.g., Global System for Mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), and the like).

The wireless internet module 113 refers to a module for wireless internet access and may be disposed internal and external to the electronic device 100. The wireless internet module 113 may transmit and receive wireless signals for data communication in a communication network according to wireless internet technologies.

The wireless internet technology includes, for example, wireless LAN (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

The local area communication module 114 is used for local area communication and supports the local area communication by using at least one of Bluetooth™, radio frequency identification (RFID), infrared data association (IrDA), ultra-wideband (UWB), ZigBee, near field communication (NFC), wireless-fidelity (Wi-Fi), Wi-Fi Direct, and wireless universal serial bus (USB).

The location information module 115 is a module for obtaining the location (or current location) of the electronic device 100, and a representative example thereof includes a global positioning system (GPS) module or a wireless fidelity (WiFi) module. For example, when the electronic device 100 utilizes the GPS module, the electronic device 100 may obtain the location of the electronic device 100 using a signal transmitted from a GPS satellite.

The input unit 120 may include a camera 121 for inputting an image data, a microphone 122 for receiving an audio data, and a user input unit 123 for receiving information from a user. According to an embodiment of the present disclosure, the camera 121 may include a plurality of cameras that performs capturing in directions different from each other, and the microphone 122 may include a plurality of microphones constituting the directional microphone array.

The audio data or image data collected by the input unit 120 may be analyzed and processed according to control commands of a user.

The camera 121 processes an image frame such as a still image or a video obtained by an image sensor in a video call mode or a capturing mode. The processed image frame may be displayed on the display unit 151 or stored in the memory 170.

The microphone 122 processes external sound signals into electrical voice data. The processed voice data may be utilized in various ways according to a function (or an application program being executed) performed by the electronic device 100. Meanwhile, various noise reduction algorithms may be implemented in the microphone 122 in order to remove noises generated during receiving the external sound signals.

The user input unit 123 is used for receiving information from a user. When information is input through the user input unit 123, the processor 180 may control an operation of the electronic device 100 to correspond to the input information.

The user input unit 123 may include a mechanical input means (or a mechanical key, such as a button, a dome switch, a jog wheel, a jog switch located at front/rear surface or side surface of the electronic device 100) and touch input means. As an example, the touch input means may include a virtual key, a soft key, or a visual key displayed on the touch screen through a software process, or include a touch key disposed on a region other than the region where the touch screen is located.

The sensing unit 140 may include one or more sensors for sensing at least one of information in the electronic device 100, surrounding environment information surrounding the electronic device 100, and user information.

For example, the sensing unit 140 may include at least one of a proximity sensor, an illumination sensor, a touch sensor, an acceleration sensor, a magnetic sensor, a gravity sensor, a gyroscope sensor, motion sensor, RGB sensor, infrared sensor (IR sensor), fingerprint scan sensor, ultrasonic sensor, optical sensor (e.g., camera, see 121), microphones (e.g., see 122), battery gauges, environmental sensors (e.g. barometers, hygrometers, thermometers, radiation sensors, heat sensors, gas sensors, etc.), chemical sensors (e.g. an electronic nose, a healthcare sensor, a biometric sensor, etc.). Meanwhile, the electronic device 100 disclosed in the present disclosure may use a combination of information detected by at least two or more of these sensors.

The output unit 150 is used to generate outputs related to visual, auditory, or tactile senses, and includes at least one of a display unit 151, a sound output unit 152, a haptic module 153, and a light output unit 154.

The display unit 151 displays (outputs) information processed by the electronic device 100. For example, the display unit 151 may display execution screen information of an application program operated in the electronic device 100, or user interface (UI) and graphic user interface (GUI) information according to the execution screen information.

The display unit 151 is structured in a manner as to have a layer structure with a touch sensor or be integrally formed with a touch sensor, thereby implementing a touch screen. The touch screen may function as a user input unit 123 providing an input interface between the electronic device 100 and the user, while providing an output interface between the electronic device 100 and the user.

The sound output unit 152 may output audio data received from the wireless communication unit 110 or stored in the memory 170 in a call signal reception mode, a call mode, a recording mode, a speech recognition mode, a broadcast reception mode, and the like.

The sound output unit 152 may include at least one of a receiver, a speaker, and a buzzer.

The haptic module 153 may generate various tactile effects that a user can feel. A representative example of the tactile effect generated by the haptic module 153 may include vibration.

The light output unit 154 outputs a signal for notifying event occurrence by using light from a light source of the electronic device 100. Examples of events occurring in the electronic device 100 may include message reception, call signal reception, a missed call, an alarm, a schedule notification, email reception, information reception through an application, and the like.

The interface unit 160 serves as a path to various types of external devices connected to the electronic device 100. The interface unit 160 may include at least one of a wired/wireless headset port, an external charger port, a wired/wireless data port, a memory card port, port connecting a device equipped with an identification module, an audio input/output (I/O) port, a video input/output (I/O) port, and an earphone port. In response to the connection of the external device to the interface unit 160, the electronic device 100 may perform appropriate control related to the connected external device.

Meanwhile, the identification module is a chip that stores a variety of information for authenticating the use rights of the electronic device 100, and includes a user identification module (UIM), subscriber identity module (SIM), universal subscriber identity module (USIM), and the like. The device equipped with the identification module (hereinafter referred to as an "identification device") may be manufactured in the form of a smart card. Therefore, the identification device may be connected to the electronic device 100 through the interface unit 160.

The memory 170 stores data supporting various functions of the electronic device 100. The memory 170 may store multiple application programs or applications that are driven in the electronic device 100, data used for operating the electronic device 100, instructions, and data used for operation of the learning processor 130 (e.g., at least one algorithm information for machine learning, etc.).

The power supply unit 190 may supply power to each component included in the electronic device 100 by receiving an external power source or an internal power source under the control of the processor 180. The power supply unit 190 includes a battery, which may be a built-in battery or a replaceable battery.

The processor 180 may determine or predict at least one executable operation of the electronic device 100 on the basis of information generated or determined using data analysis and machine learning algorithm. To this end, the processor 180 may request, search, receive, or utilize data of the learning processor 130, and control the electronic device 100 to perform a predicted operation or an operation determined to be desirable among the at least one executable operation.

The processor 180 may perform various functions for implementing intelligent emulation (i.e., a knowledge based system, an inference system, and a knowledge acquisition system). The functions may be applied to various types of systems (e.g., fuzzy logic systems), including adaptive systems, machine learning systems, artificial neural networks, and the like.

The processor 180 may also include sub-modules that enable operations involving speech and natural language speech processing, such as an I/O processing module, an environmental condition module, a speech-to-text (STT) processing module, a natural language processing (NLP) module, a workflow processing module, and a service processing module.

Each of these submodules may have access to one or more systems, or data and model, or a subset or super set thereof, in the electronic device 100. In addition, each of these submodules may provide various functions, including lexical index, user data, workflow model, service model, and automatic speech recognition (ASR) system.

According to other embodiments, other aspects of the processor 180 or the electronic device 100 may be implemented with the submodule, system, or data and model.

According to some embodiments, based on data of the learning processor 130, the processor 180 may be configured to detect requirements on the basis of a user's intention or a contextual condition expressed in user input or natural language input.

The processor 180 may actively derive and obtain the information required to fully determine the requirements based on the contextual condition or the user's intention. For example, the processor 180 may actively derive the information required to determine the requirements by analyzing historical data, including historical input and output, pattern matching, unambiguous words, input intent, and the like.

The processor 180 may determine a flow of operations for executing a function in response to the requirement based on the contextual condition or the user's intention.

The processor 180 collects, detects, extracts, and/or receives signals or data used for data analysis and machine learning tasks through one or more sensing components in the electronic device 100 to collect information for processing and storage in the learning processor 130.

The information collection may include sensing information via a sensor, extracting information stored in memory 170, receiving information from another electronic device, entity, or external storage device via a communication means, and so on.

The processor 180 may collect and store usage history information of the electronic device 100.

The processor 180 can use the stored usage history information and predictive modeling to determine the best match in which a particular function is executed.

The processor 180 may receive or detect surrounding environment information or other information through the sensing unit 140.

The processor 180 may receive a broadcast signal and/or broadcast related information, a wireless signal, and wireless data through the wireless communication unit 110, and may communicate with an external electronic device.

The processor 180 may receive image information (or a corresponding signal), audio information (or a corresponding signal), data, or user input information from the input unit 120.

The processor 180 collects information in real time, processes or classifies the information (e.g., knowledge graph, command policy, personalization database, conversation engine, etc.), and stores the processed information in the memory 170 or the learning processor 130.

When the operation of the electronic device 100 is determined on the basis of data analysis and machine learning algorithms and techniques, the processor 180 may control components of the electronic device 100 to perform the determined operation. The processor 180 may control the electronic device 100 according to the control command, thereby performing the determined operation.

When a specific operation is executed, the processor 180 analyzes historical information indicating execution of the specific operation through data analysis and machine learning algorithms and techniques, and updates the previously learned information on the basis of the analyzed information.

Accordingly, the processor 180 may improve accuracy of future performance of data analysis and machine learning algorithms and techniques on the basis of the updated information, together with the learning processor 130.

The processor 180 typically controls the overall operation of the electronic device 100 in addition to the operations associated with the application program. For example, when the state of the electronic device 100 satisfies a set condition, the processor 180 may execute or release a lock state that restricts an input of a user's control command to the applications.

The processor 180 may process signals, data, information, or the like input or output through the above-described components or operate the application program stored in the memory 170, thereby providing or processing information or functions that are suitable for the user.

In addition, the processor 180 may control at least some of the components shown in FIG. 1 to operate the application program stored in the memory 170. In addition, the processor 180 may operate a combination of at least two of the components included in the electronic device 100 in combination with each other to run the application program.

The learning processor 130 may be configured to receive, classify, store, and output information to be used for data mining, data analysis, intelligent decision making, and machine learning algorithms and techniques.

The learning processor 130 may include one or more memory units configured to store data, which is received, detected, sensed, generated, and predefined by the electronic device 100; is received, detected, sensed, generated, and predefined using other methods; or is outputted by other components, devices, electronic devices, or devices in communication with the electronic device.

The learning processor 130 may include a memory integrated with or implemented in the electronic device 100. According to some embodiments, the learning processor 130 may be implemented using the memory 170.

Alternatively or additionally, the learning processor 130 may be implemented using a memory associated with the electronic device 100, such as an external memory coupled directly to the electronic device 100, or a memory maintained in a server in communication with the electronic device 100.

In another embodiment, the learning processor 130 may be implemented using a memory maintained in a cloud computing environment, or another remote memory accessible by the electronic device 100 through a communication scheme such as a network.

The learning processor 130 may be typically configured to store data in one or more databases, in order to perform supervised learning, unsupervised learning, reinforcement learning, data mining, predictive analytics, or identify, index, categorize, manipulate, store, retrieve, and output the data for use in other electronic devices.

The information stored by the learning processor 130 may be used by one or more other controllers of the processor 180 or the electronic device 100 using any of a variety of different types of data analysis algorithms and machine learning algorithms.

Examples of such algorithms include k-near neighbor systems, fuzzy logic (e.g. probability theory), neural networks, Boltzmann machines, vector quantization, pulse neural networks, support vector machines, maximum margin classifiers, hill climbing, inductive logic systems Bayesian networks, Petri nets (e.g., finite state machines, Millie machines, Moore finite state machines), classifier trees (e.g., Perceptron tree, support vector tree, Markov tree, decision tree forest, random forest), artificial fusion, sensor fusion, image fusion, reinforcement learning, augmented reality, pattern recognition, automated planning, and the like.

The learning processor 130 may store an artificial neural network (ANN) model used in a machine learning algorithm in a memory, store a learning model generated by training the artificial neural network model, and perform operations such as classification, detection, and recognition on the basis of data input by using the learning model.

Artificial intelligence refers to the field of researching artificial intelligence or methodology to produce the same, and machine learning refers to the field of researching methodology to define and solve various problems dealt in the field of artificial intelligence. The machine learning may be defined as an algorithm that improves the performance of any task through a steady experience on the task.

An artificial neural network is a model used for the machine learning, and may refer to a model having a problem solving ability, which is composed of artificial neurons (nodes) forming a network via synaptic coupling. The artificial neural network may be defined by a connection pattern between neurons of another layer, a learning process of updating model parameters, and an activation function of generating an output value.

Figure 2:
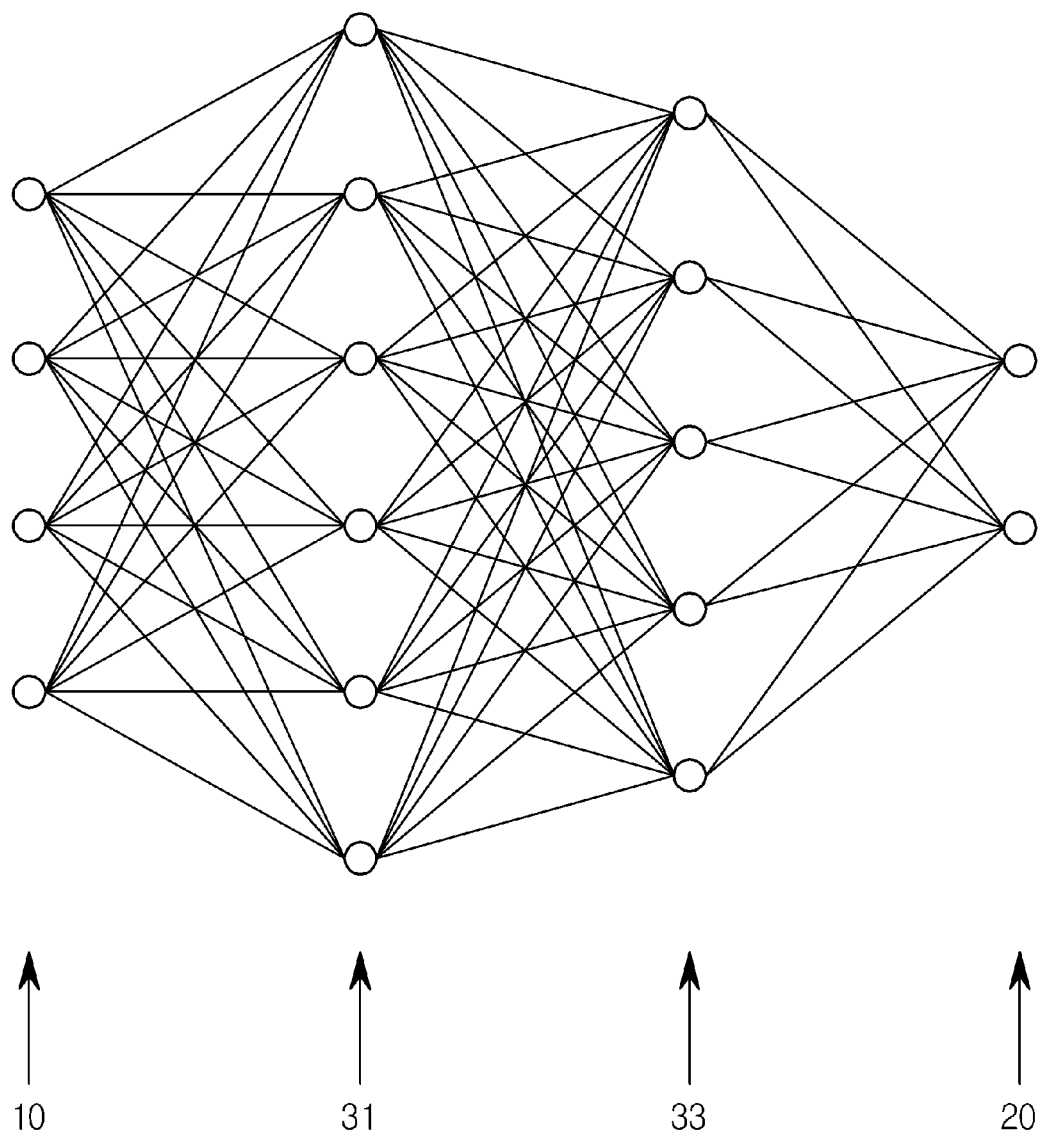
FIG. 2 is a diagram illustrating an example of a fully connected artificial neural network structure.

FIG. 2 is a diagram illustrating an example of a fully connected artificial neural network structure.

Referring to FIG. 2, an artificial neural network may include an input layer 10, an output layer 20, and optionally one or more hidden layers 31 and 33. Each layer includes one or more nodes corresponding to neurons in the neural network, and the artificial neural network may include synapses that connect between nodes in one layer and nodes in another layer. In the artificial neural network, a node may receive input signals input through a synapse, and generate an output value on the basis of an activation function of weights and deflections for each input signal. The output value of each node may act as an input signal of the next layer through synapses. An artificial neural network in which all nodes of one layer and all nodes of the next layer are connected to each other through synapses may be referred to as a fully connected artificial neural network.

The parameters of the artificial neural network model mean parameters determined through learning, and may include weights of synaptic connections and deflections of neurons. In addition, a hyper parameter refers to a parameter that should be set before learning in the machine learning algorithm, and may include a learning rate, the number of repetitions, a minimal batch size, an initialization function, and the like.

Machine learning, which is implemented by a deep neural network (DNN) including multiple hidden layers among artificial neural networks, is referred to as deep learning, and the deep learning is a part of machine learning. Hereinafter, the machine learning may be used to include the depth learning.

Figure 3:
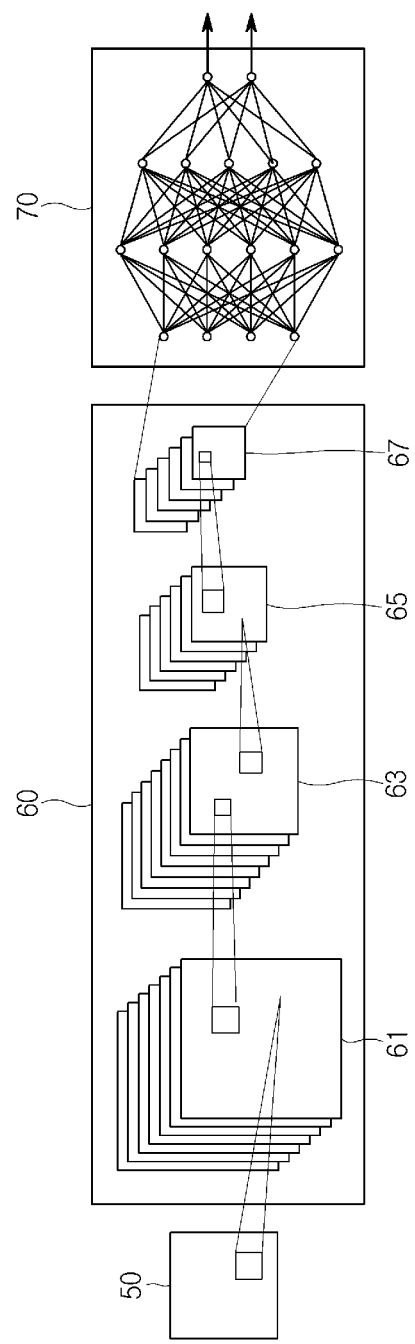
FIG. 3 is a diagram illustrating an example of a convolutional neural network (CNN) structure, which is a type of deep neural network.

FIG. 3 is a diagram illustrating an example of a convolutional neural network (CNN) structure, which is a type of a deep neural network.

A convolutional neural network as shown in FIG. 3 may be more effective in identifying structural spatial data such as images, videos, and text strings. The convolutional neural network may effectively recognize features of adjacent images while maintaining spatial information of the images.

Referring to FIG. 3, the convolutional neural network may include a feature extraction layer 60 and a classification layer 70. The feature extraction layer 60 may synthesize things located spatially close to the image using a convolution, thereby extracting a feature of the image.

The feature extraction layer 60 may be configured with multiple convolutional layers 61 and 65 and multiple pooling layers 63 and 67. The convolutional layers 61 and 65 may be obtained by applying a filter and then an activation function to input data. The convolutional layers 61 and 65 may include multiple channels, and filters and/or activation functions different from each other may be applied to each channel. The result of the convolutional layers 61, 65 may be a feature map. The feature map may be data in the form of a two-dimensional matrix. The pooling layers 63 and 67 may receive output data of the convolutional layers 61 and 65, i.e., feature map, as inputs, and may be used to reduce the size of the output data or to emphasize specific data. The pooling layers 63 and 67 may generate output data by applying max pooling that selects a maximum value, average pooling that selects an average value, and min pooling that selects a minimum value, among some data of the output data of the convolutional layers 61 and 65.

The feature map created through a series of convolutional layers and pooling layers may become gradually smaller in size. The final feature map generated through the last convolutional layer and pooling layer may be converted into a one-dimensional form and input into the classification layer 70. The classification layer 70 may be the fully connected artificial neural network structure shown in FIG. 2. The number of input nodes in the classification layer 70 may be equal to that obtained by multiplying the number of elements in the matrix of the final feature map by the number of channels.

In addition to the convolutional neural network above-described as a deep neural network structure, a recurrent neural network (RNN), a long short term memory network (LSTM), gated recurrent units (GRU), and the like may be used. The recurrent neural network may perform classification or prediction by learning sequential data, and has a cyclic structure inside so that the past learning is multiplied by a weight and reflected in the current learning. Thus, the current output result is affected by the output result in the past, and the hidden layer serves as a kind of memory function. The recurrent neural network may be used for analyzing a speech waveform to perform a machine translation, identifying components before and after sentence in a text to generate the text, or recognizing speech.

The artificial neural network learning has an adjective to determine model parameters that minimize a loss function. The loss function may be used as an index for determining an optimal model parameter in the learning process of the artificial neural network. In the case of a fully connected artificial neural network, a weight of each synapse may be determined through learning, and in the case of a convolutional neural network, a filter of a convolutional layer for extracting the feature map may be determined through learning.

The machine learning may be categorized into supervised learning, unsupervised learning, and reinforcement learning.

The supervised learning may mean a method of learning the artificial neural network in a state that a label for learning data is given, in which the label may mean a correct answer (or result value) that the artificial neural network should infer when the learning data is input to the artificial neural network. The unsupervised learning may mean a method of learning the artificial neural network in a state that a label for learning data is not given. The reinforcement learning may mean a method of learning the artificial neural network so that an agent defined in any environment selects an action or a sequence of actions that maximizes cumulative rewards in each state.

Figure 4:
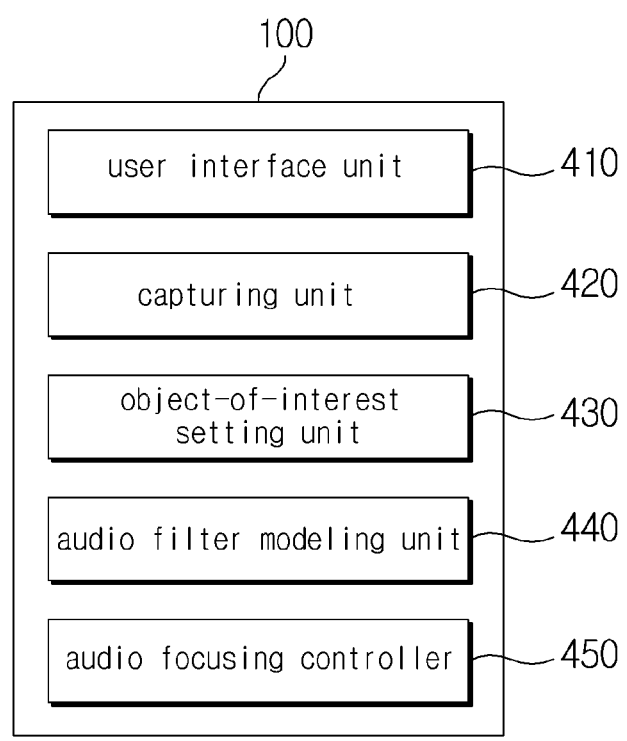
FIG. 4 is a block diagram illustrating components that are performed by at least one processor of an electronic device according to various embodiments of the present disclosure.

FIG. 4 is a block diagram illustrating components that are performed by at least one processor of an electronic device according to various embodiments of the present disclosure. The components shown in FIG. 4 may be software programs or application modules that may be executed by the processor 180 and/or the learning processor 130 of FIG. 1. Some components may be implemented as separate chips, ASICs, or FPGAs designed to operate only the corresponding component. Herein, the component may be considered as a hardware module. In addition, the at least one processor may include a general purpose processor and a chip, an ASIC, or an FPGA designed to perform a specific function or configuration. The configuration shown in FIG. 4 is just only one embodiment. According to another embodiment, one component shown in FIG. 4 may be divided into several components, or several components are integrated into each other to form one component. In addition, according to another embodiment, some of the components shown in FIG. 4 may be deleted or components not shown in FIG. 4 may be added.

Referring to FIG. 4, the electronic device 100 may include a user interface unit 410, a capturing unit 420, an object-of-interest setting unit 430, and an audio focusing controller 450, and further include an audio filter modeling unit 440.

According to various embodiments of the present disclosure, the user interface unit 410 may receive a command from the user or control the output unit 150 to provide information to the user. According to an embodiment of the present disclosure, the user interface unit 410 may control the output unit 150 so that images or videos received from the capturing unit 420 is displayed on a screen of the display unit 151. In addition, when a tag input operation is performed by a user, the user interface unit 410 may obtain location information of the tag input. According to an embodiment, the user interface unit 410 may obtain coordinate information touched by a user or coordinate information clicked via a mouse on the touch screen.

According to various embodiments of the present disclosure, the capturing unit 420 may capture a video. The captured video may include image data and voice data. The capturing unit 420 may store the captured video in the memory 170. Herein, when a user performs a touch input, the touch information from the user interface unit 410 may be stored together.

According to various embodiments of the present disclosure, the object-of-interest setting unit 430 may select objects of interest on the basis of the user's input and set the importance of each of the objects of interest. In addition, the audio focusing controller 450 may control allocation of audio focusing on the basis of the distribution of the selected objects of interest in the image and the set importance of each object.

According to various embodiments, an audio filter modeling unit 440 may be additionally included. The audio filter modeling unit 440 may model a voice feature on the basis of voice data of the object of interest and generate an audio filter capable of emphasizing the voice of each object of interest. The audio filter may be applied when it is determined that the voice of the object of interest is received and may be used to emphasize the voice of the object of interest.

FIGS. 5A to 5D illustrate a user interface that receives a user input for audio focusing on multiple objects of interest according to various embodiments of the present disclosure. FIG. 5A to 5D may be displayed on a screen of the display unit 151 under the control of the user interface unit 410.

Figure 5A:
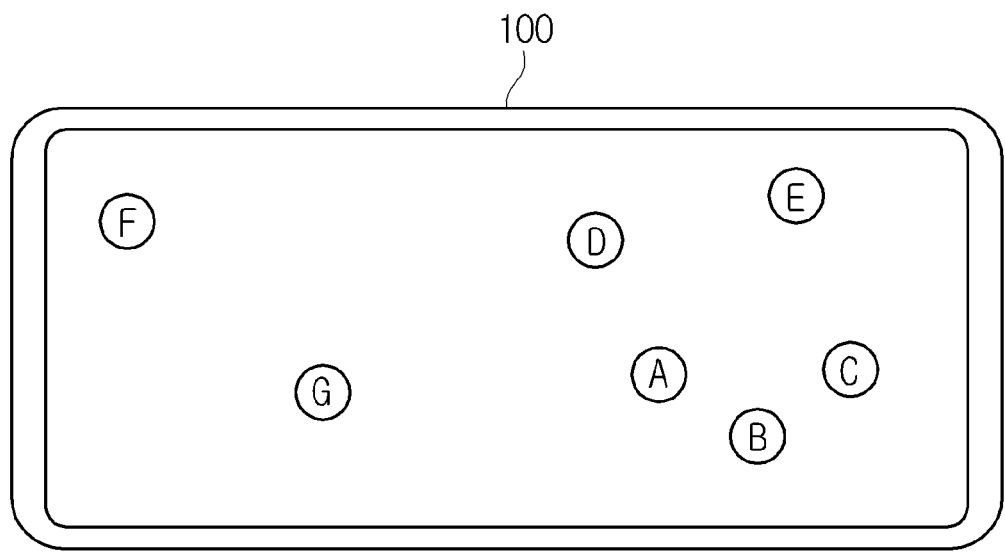
FIGS. 5A to 5D illustrate a user interface that receives a user input for audio focusing on multiple objects of interest according to various embodiments of the present disclosure.

FIG. 5A illustrates an embodiment in which a video captured by a camera is displayed on a screen of the display unit 151. Referring to FIG. 5A, according to an embodiment, the user interface unit 410 of the processor 180 may display an image including objects A through G captured by the camera 121 on the display unit 151. The user may select multiple objects which are to be subject to audio focusing from among the objects displayed on the display unit 151. In addition, when selecting the multiple objects which are to be subject to audio focusing, the user may also set the importance of each object.

According to various embodiments of the present disclosure, a user may perform a single touch input for selecting an object, a long touch input for selecting an object and selecting the importance of the corresponding object, and a dual touch input for canceling the selected object. The long touch input may be accomplished by performing touch and swiping or by holding touch for a preset time. Herein, the importance of the object may be determined in proportion to the length of the swiping or the preset time for which the touch is maintained. According to another embodiment, the user may perform operations equivalent to a single touch input (e.g., single mouse click), a long touch input (e.g., mouse click and swiping), and double touch input (e.g., mouse double click) by using a mouse or other equivalent input tool for the electronic device 100 that does not have a touch screen, instead of touch input using the touch screen.

Figure 5B:
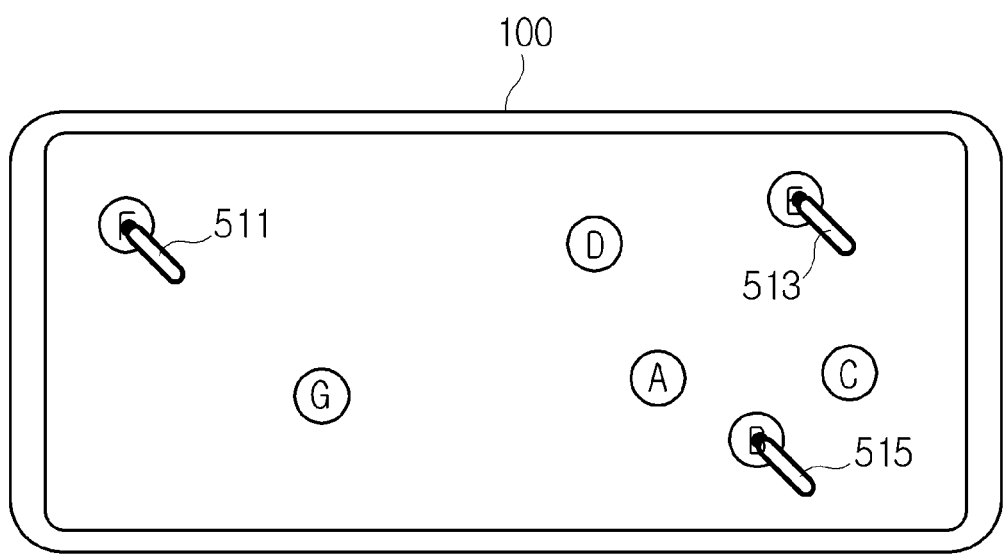

According to an embodiment of FIG. 5B, it may be seen that, based on the user's input, a single touch input 511 for an object F, a single touch input 513 for an object E, and a single touch input 515 for an object B are generated in the user interface unit 410. The user interface unit 410 may transfer the above-described touch inputs to the object-of-interest setting unit 430. The object-of-interest setting unit 430 may be provided in such a manner to select objects B, E, and F as objects of interest and to have the same importance in performing the audio focusing on the objects B, E, and F, in response to a user's single touch input performed only for object selection for audio focusing.

According to another embodiment, the object-of-interest setting unit 430 may automatically set the importance of each object according to the selection frequency based on the user's selection pattern in the past for the objects (e.g., B, E, and F of FIG. 5B) selected as the objects of interest by the user. To this end, the object-of-interest setting unit 430 may perform object recognition on the selected object and store the selection frequency of the recognized object. Herein, the object recognition may be performed using an artificial intelligence technique based on a convolutional neural network model shown in FIG. 3.

According to another embodiment, the object-of-interest setting unit 430 may automatically set the importance of each object according to the frequency in which the corresponding object appears in videos or images stored for the objects (e.g., B, E, and F of FIG. 5B) selected as the objects of interest by the user. According to an embodiment of the present disclosure, the object-of-interest setting unit 430 may provide a parameter related to whether to automatically set the importance of the object selected by the user, and the user may set the parameter in a user interface for setting a separate application parameter.

Figure 5C:
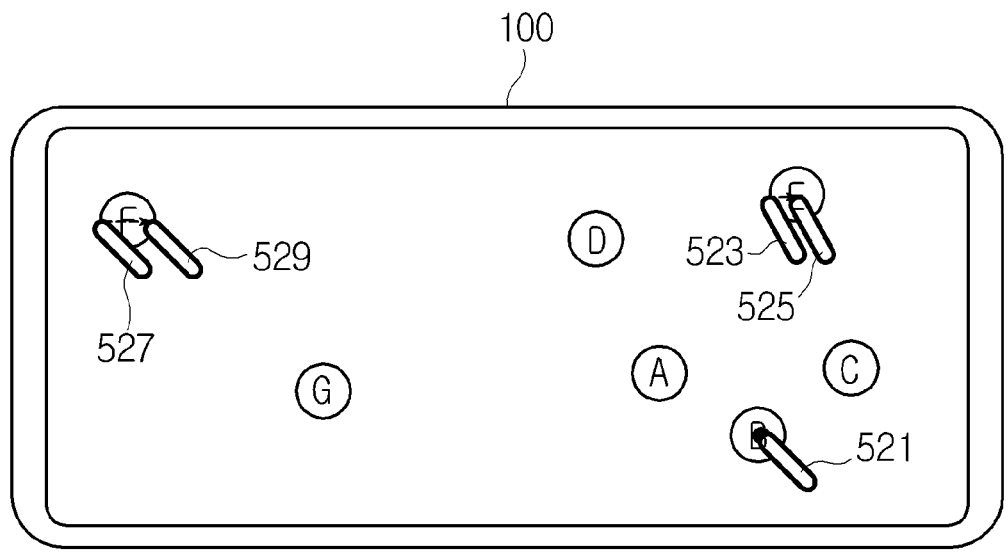

According to an embodiment of FIG. 5C, a user may select an object of interest for audio focusing and set the importance of the object of interest. It may be appreciated that touch and swiping inputs 527 and 529 for the user's object F, touch and swiping inputs 523 and 525 for the user's object E, and a single touch input 521 for the user's object B are generated in the user interface unit 410. The user interface unit 410 may transmit the recognized information to the object-of-interest setting unit 430. The object-of-interest setting unit 430 may set the importance of the object in proportion to the swiping length in the touch and swiping inputs. In one embodiment of FIG. 5C, the object-of-interest setting unit 430 may set a higher importance for the object F than the object E, on the basis of the fact that swiping length of the object F is longer than that of the object E. The object-of-interest setting unit 430 recognizes only the single touch input 521 with respect to the object B, thereby setting the lowest importance for the object B. According to another embodiment, the user interface unit 410 may recognize toughing and holding for a preset time, instead of the touch and swiping inputs. The object-of-interest setting unit 430 may set the importance of each object of interest on the basis of the amount of the preset time maintained.

Figure 5D:
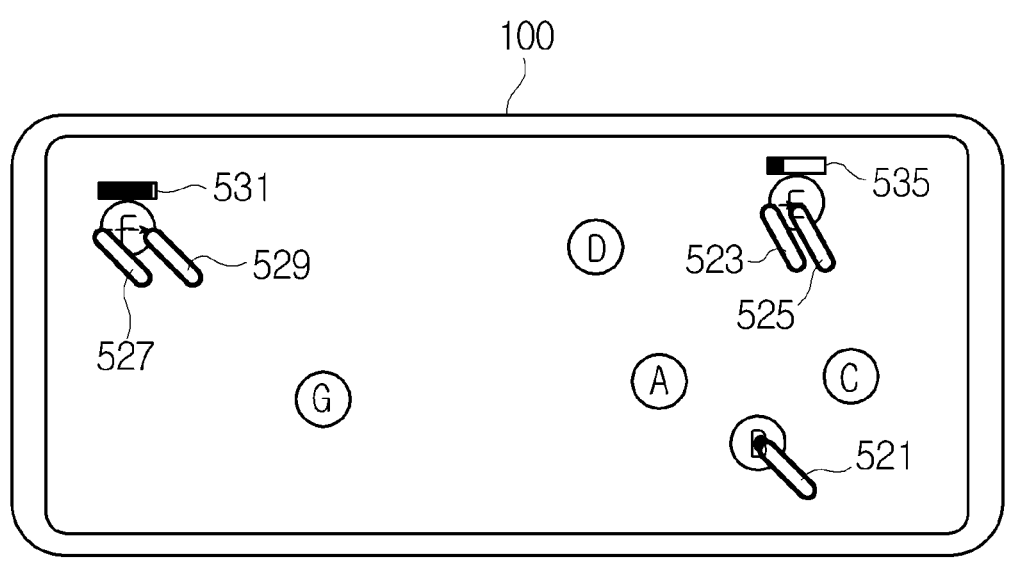

FIG. 5D is a diagram illustrating an example in which the user interface unit 410 of the processor 180 displays a degree of importance set for a corresponding object when a user performs touch and swiping inputs.

The user interface unit 410 may display the user interface 531, 535 on the display unit 151 to indicate the importance set in proportion to the swiping length or the touch holding time, thereby making it possible to provide the same to the user. The user interface unit 410 may display the user interfaces 531 and 535 on or around the corresponding object of the display unit 151 at the time point when the swiping starts after initiating touch, and at the startup, the lowest level of importance is displayed, and as the swiping becomes longer, the object may be displayed as having a higher level of importance. According to an embodiment, the user interface unit 410 may display a bar graph. For example, the user interface unit 410 displays a bar graph that is all white to indicate the lowest level of importance at the start of swiping and then displays the bar graph having a gradually increasing black portion as the swipe length increases. Accordingly, the user may recognize the importance set on the basis of the length of the black portion in the bar graph.

Figure 6:
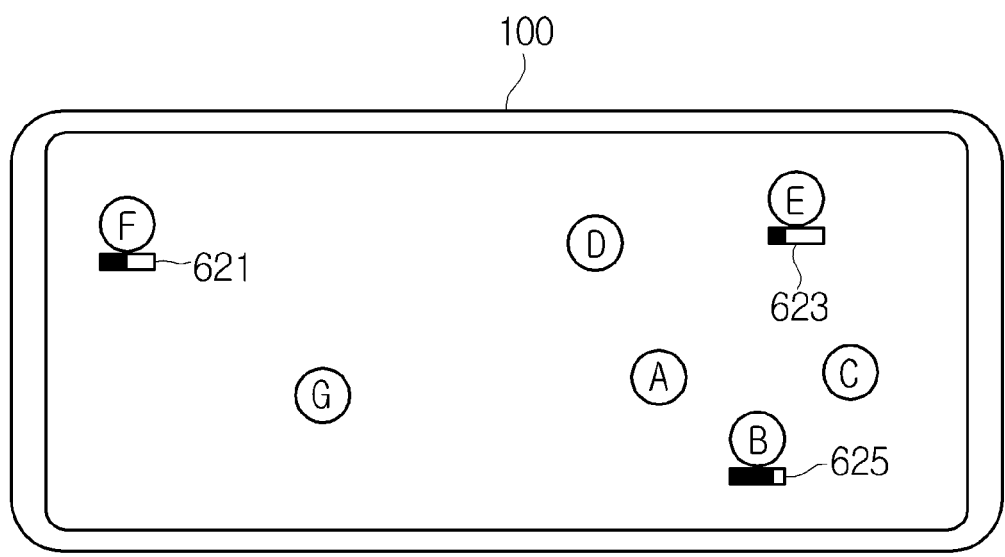
FIG. 6 is a diagram illustrating an example in which a user interface unit displays the importance set in an object of interest.

FIG. 6 is a diagram illustrating an example in which a user interface unit 410 displays the importance set in an object of interest.

Referring to FIG. 6, after the user completes selecting an object of interest and/or setting importance, the user interface unit 410 may display the setting result on the display unit 151. The setting result shown in FIG. 6 may be a result of selecting the object of interest and setting the importance or a result that the object-of-interest setting unit 430 of the processor 180 automatically set the importance on the basis of the user's selection of object of interest. According to an embodiment of the present disclosure, when there is no input by the user for a preset time, the user interface unit 410 may determine that the user completes selecting the object of interest and/or setting the importance. According to another embodiment, when a user's touch is performed in a location where there is no object, the user interface unit 410 may determine that the user completes selecting the object of interest and/or setting the importance. According to another embodiment, when a user touches or presses a virtual key displayed at a specific location of the display unit 151 or a button located at the front/rear surface or side surface of the electronic device 100, the user interface unit 410 may determine that the user completes selecting the object of interest and/or setting the importance. In addition, the user interface unit 410 may transmit a signal indicating that a user input is completed to the object-of-interest setting unit 430 and the audio focusing controller 450.

According to various embodiments, the audio focusing controller 450 may determine the distribution of the objects of interest in the screen displayed on the display unit 151 when the user completes selecting the object of interest and setting the importance. According to an embodiment of the present disclosure, the audio focusing controller 450 may determine the importance and location of each object of interest in the screen. According to an embodiment of the present disclosure, the location may be identified as a coordinate (x, y) on a coordinate system having the electronic device 100 as the origin. By identifying the location of the object of interest, the audio focusing controller 450 may identify the direction and distance of the object of interest. The audio focusing controller 450 may allocate the audio focusing on the basis of the identified overall distribution. According to an embodiment, the audio focusing controller 450 may perform the allocation of audio focusing by adjusting the activity of each microphone included in the directional microphone array in order to perform optimal audio focusing in the identified overall distribution. For example, the audio focusing controller 450 may adjust the activity on the basis of the location of the object of interest or the distance from the electronic device and the importance set in the object of interest.

Figure 7:
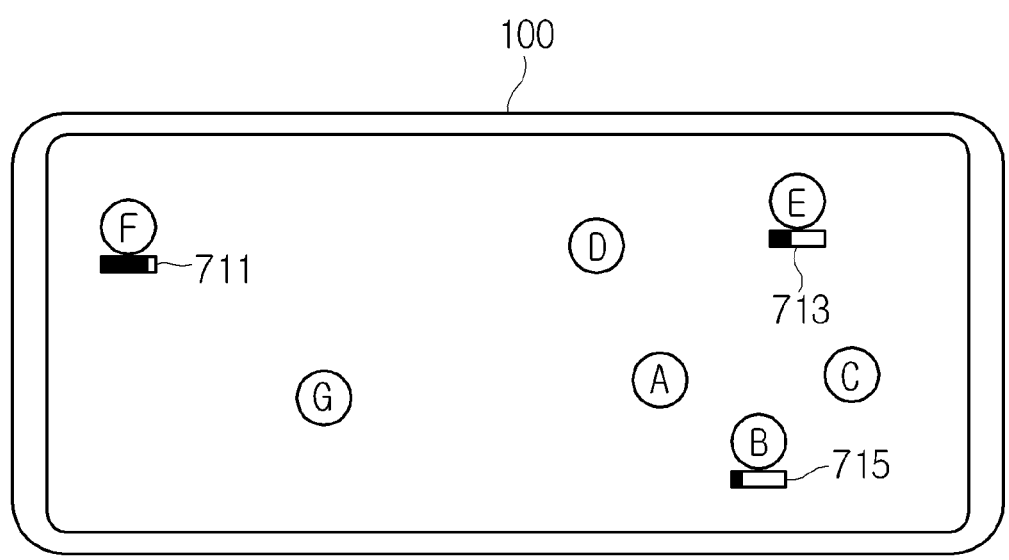
FIG. 7 is a diagram illustrating an example in which an audio focusing controller adjusts activity of a microphone on the basis of the location and importance of an object of interest according to various embodiments of the present disclosure.
Figure 7:
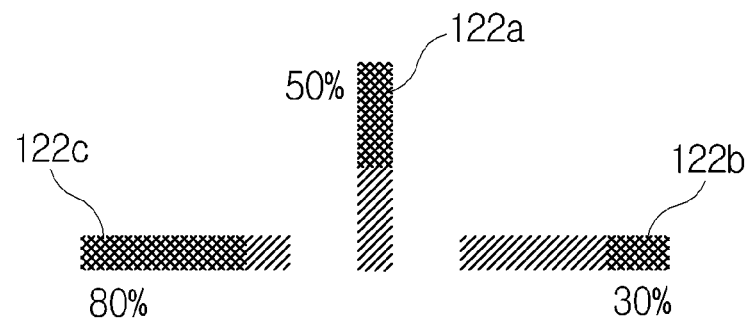

FIG. 7 is a diagram illustrating an example in which an audio focusing controller 450 adjusts activity of a microphone on the basis of the location and importance of an object of interest according to various embodiments of the present disclosure.

Referring to FIG. 7, the audio focusing controller 450 may determine that an object F at the top left has the highest importance 711, an object E at the top right has the next importance 713, and an object B at the bottom right has the lowest importance 715. The audio focusing controller 450 may allocate the audio focusing by adjusting the activity of each of the microphones 122a, 122b, and 122c on the basis of the location and importance of the object of interest. According to the example of FIG. 7, the audio focusing controller 450 performs control so that a high activity (e.g., 80%) is given for a microphone 122c directed toward the object F with the highest importance, and a low activity (e.g., 30%) is given for a microphone 122b directed toward the object E and object B with less importance than the object F. In addition, the microphone 122a directed toward the center may be adjusted to have a medium activity (e.g., 50%). As shown in FIG. 7, the audio focusing controller 450 performs control so that a high activity is given for the microphone 122c directed toward the object of high importance, thereby allocating most audio focusing to the object of interest of high importance.

According to various embodiments of the present disclosure, the processor 180 may recognize an object of interest and additionally apply audio filtering configured according to a feature of a voice issued from the recognized object of interest. According to an embodiment of the present disclosure, the audio filter modeling unit 440 of the processor 180 may identify a main frequency band of the voice through spectrum analysis of the voice issued from the object of interest, and configure audio filtering on the basis of the result. The electronic device 100 may add audio filtering to the recognized object of interest, thereby emphatically acquiring the voice of the object of interest together with audio focusing.

The audio focusing controller 450 may adjust the activity of the microphone in consideration of the audio filtering effect. According to an embodiment of the present disclosure, the audio focusing controller 450 may apply audio filtering and thus adjust the activity of the microphone to be lower, compared to when the audio filtering is not applied. As a result, since the size of the voice and ambient noise of the object of interest obtained from the microphone is reduced, but the voice of the object of interest may be emphasized via audio filtering, the voice of the target object may be obtained while reducing the noise compared to when audio filtering is not applied.

According to another embodiment, when the distance to the ambient noise is too close to emphasize the voice of the object of interest even though the audio focusing is applied, the audio focusing controller 450 may apply the audio filtering while lowering the audio focusing allocation to the object of interest. As a result, the voice of the object of interest may be emphatically obtained while reducing the size of the ambient noise.

According to various embodiments of the present disclosure, a device (e.g., an electronic device of FIG. 1) may comprise a camera (e.g., a camera 121 of FIG. 1) configured to capture a video; a microphone array (e.g., a microphone 122 of FIG. 1 or microphones 122a, 122b, and 122c of FIG. 7) composed of multiple microphones, a display (e.g. a display unit 151 of FIG. 1) configured to display the captured video, an input unit (e.g., a user input unit 123 or a sensing unit 140) configured to receive inputs and at least one processor (e.g., processor 180 and learning processor 130 of FIG. 1).

According to various embodiments, the at least one processor may be configured to cause the display to display the captured video, obtain objects of interest from the video based on an input received through the input unit, set an importance value corresponding to at least one object of interest from among the obtained objects of interest, wherein the importance value prioritizes objects of interest, obtain location information of the at least one object of interest; and distribute audio focusing to the at least one object of interest based on the set importance value and the obtained location information.

According to various embodiments, the at least one processor may be further configured to select the at least one object of interest based on receiving, through the input unit, the input corresponding to the at least one object of interest in the captured video, wherein the input corresponds to a touch input or a mouse click input.

According to various embodiments, the at least one processor may be further configured to deselect the at least one object of interest based on receiving, through the input unit, a second input corresponding to the at least one object of interest in the captured video, wherein the second input corresponds to a double touch input or a mouse double click input.

According to various embodiments, the at least one processor may be further configured to both select the at least one object of interest and set the importance value based on receiving, through the input unit, the input corresponding to the at least one object of interest object in the captured video, wherein the input corresponds to a touch-and-swiping operation or a touching operation held for at least a preset time.

According to various embodiments, the importance value is set based on a frequency of past selections of each of the at least one object of interest.

According to various embodiments, the device may further comprises a memory configured to store captured videos, wherein the importance value is set based on a frequency of appearances of the objects of interest in the stored captured videos.

According to various embodiments, the at least one processor may be further configured to generate an artificial neural network model for storing image features, extract images of the objects of interest from the captured video, train the generated artificial neural network model through supervised learning by using the extracted images of the objects of interest as training data, extract object images from the captured videos stored in the memory and classify the extracted object images into objects of interest by inputting the extracted object images into the artificial neural network model, wherein the importance value is set based on a frequency of each of the classified objects of interest.

According to various embodiments, the at least one processor may be configured to cause the display to display a graphical indicator corresponding to the set importance value together with the captured video.

According to various embodiments, the audio focusing is distributed based on adjusting activity of each of the multiple microphones.

According to various embodiments, the at least one processor may be configured to apply audio filtering to the at least one object of interest according to a voice feature associated with objects of interest, wherein the audio focusing is distributed in consideration of an audio filtering effect.

Figure 8:
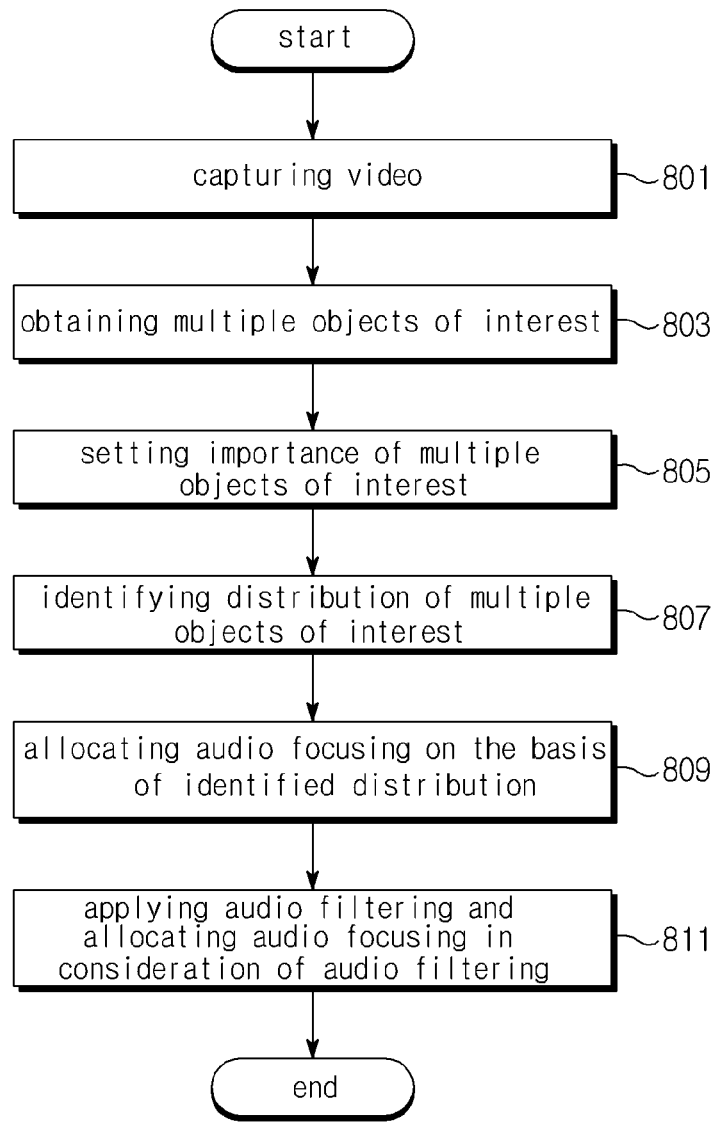
FIG. 8 is a flowchart illustrating an operation in which an electronic device allocates audio focusing to each of multiple objects of interest according to various embodiments of the present disclosure.

FIG. 8 is a flowchart illustrating an operation in which an electronic device 100 allocates audio focusing to each of multiple objects of interest according to various embodiments of the present disclosure. The operation according to the flowchart shown in FIG. 8 may be implemented by an electronic device (e.g., electronic device 100 of FIG. 1) or at least one processor (e.g., processor 180 or learning processor 130 of FIG. 1) of the electronic device.

Referring to FIG. 8, in operation 801, the electronic device 100 may capture a video using the camera 121 and display the captured video on a screen of the display unit 151.

According to various embodiments of the present disclosure, in operation 803, the electronic device 100 may obtain multiple objects of interest included in a video displayed on the display unit 151. According to an embodiment of the present disclosure, the electronic device 100 may obtain multiple objects of interest on the basis of a user's selection input from the video displayed on the display unit 151.

According to various embodiments of the present disclosure, in operation 805, the electronic device 100 may set the importance of the object of interest. According to an embodiment, the electronic device 100 may set the importance of the object of interest on the basis of the user's input. For example, the electronic device 100 may set the importance of the object of interest on the basis of swiping length or touch holding time of the user's long touch input. According to another embodiment, the electronic device 100 may automatically set the importance of the object of interest. For example, the electronic device 100 may automatically set the importance of the object of interest on the basis of the frequency in which the user selects the object of interest or on the basis of the frequency in which the object of interest appears in the videos or images stored in the memory 170. In addition, the electronic device 100 may display the set importance information of the object of interest on the screen of the display unit 151, in order to notify the user of the same. According to an embodiment, the electronic device 100 may display the set importance for the object of interest in a bar graph form on or around the object of interest on the screen, as shown in FIG. 6.

According to an embodiment of the present disclosure, when the electronic device 100 obtains an object of interest and sets the importance on the basis of the user's input, the electronic device 100 selects an object of interest and sets the importance on the basis of one operation of the user. For example, the electronic device 100 may obtain a single touch input, a long touch input, and a dual touch input of the user, and select an object of interest and set the importance for the selected object of interest on the basis of the same.

According to various embodiments of the present disclosure, in operation 807, the electronic device 100 may identify the entire distribution of the object of interest in the screen. As an example, the electronic device 100 may determine the location of the object of interest or the distance between the electronic device 100 and the object of interest, or the importance of the object of interest.

According to various embodiments, in operation 809, the electronic device 100 may allocate audio focusing to each of the objects of interest on the basis of the identified allocation. According to an embodiment of the present disclosure, the electronic device 100 may perform allocation of audio focusing by adjusting the activity of a plurality of microphones (e.g., microphones 122a, 122b and 122c of FIG. 7).

For example, the electronic device 100 may be configured to have high activity for microphones directed toward the object of interest with high importance and to have low activity for microphones directed toward the object of interest with low importance, thereby performing the allocation of audio focusing on the basis of the importance of interest. According to an embodiment, the activity of each microphone may be determined on the basis of a product of the distance between the electronic device 100 and the object of interest and the importance of the object of interest. For example, although the importance of the object of interest is relatively low, when the object of interest is far from the electronic device 100, the activity of the microphone may be greater when compared to the object of interest with high importance.

According to various embodiments, in operation 811, the electronic device 100 may apply audio filtering to an object of interest and may reallocate audio focusing in consideration of the audio filtering. In order to perform the operation 811, the electronic device 100 may use an object recognition technology and a voice analysis technology. According to an embodiment, the object recognition technology and the voice analysis technology may be based on an artificial intelligence technology.

The electronic device 100 may analyze a voice of an object selected as the object of interest to identify the feature thereof and design the audio filter so that the voice of the object is optimally obtained according to the feature to apply audio filtering. In addition, the electronic device 100 may store the designed audio filter in the memory 170. When the audio filter for the selected object of interest has been already designed and stored in the memory 170, the electronic device 100 may apply audio filtering using the corresponding audio filter.

After applying the audio filtering, the electronic device 100 may perform audio focusing allocation again in consideration of the filtering effect. According to an embodiment of the present disclosure, the electronic device 100 may adjust the activity of the microphone so that the amount of emphasis of the voice from the object of interest after applying the audio filtering is equal to or greater than that of the voice before applying the audio filtering. This additional audio focusing allocation may enhance the emphasis on voices of the object of interest as a whole.

Figure 9:
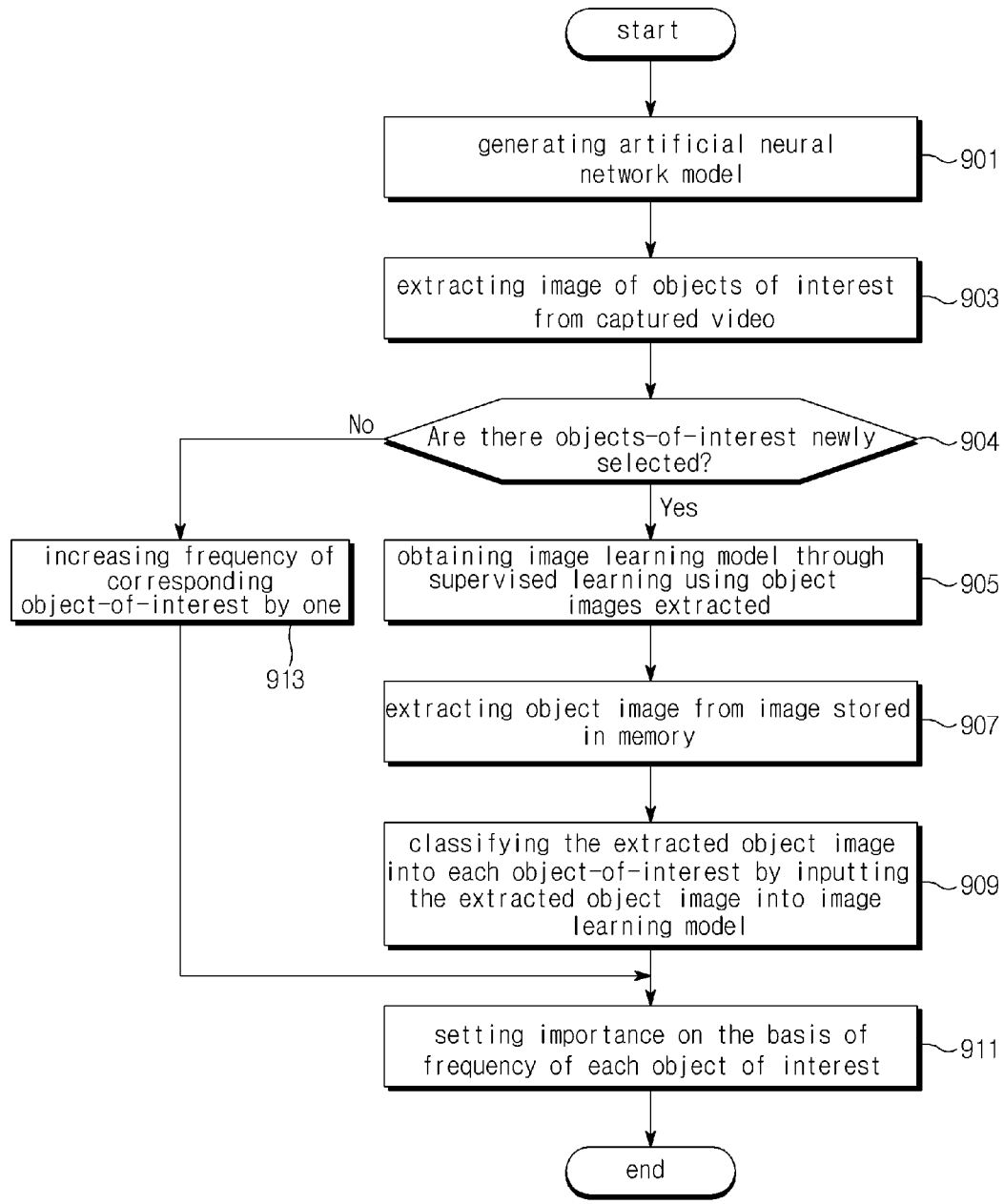
FIG. 9 is a flowchart illustrating an operation in which the electronic device automatically sets the importance of an object of interest using an artificial neural network model, according to various embodiments of the present disclosure.

FIG. 9 is a flowchart illustrating an operation in which the electronic device 100 automatically sets the importance of an object of interest using an artificial neural network model, according to various embodiments of the present disclosure. An operation according to the flowchart shown in FIG. 9 may be implemented by an electronic device (e.g., electronic device 100 of FIG. 1) or at least one processor (e.g., processor 180 or learning processor 130 of FIG. 1) of the electronic device.

Referring to FIG. 9, in operation 901, the electronic device 100 may generate an artificial neural network model for storing image features. In one embodiment, the artificial neural network model may be a convolutional neural network (e.g., a convolutional neural network of FIG. 3) having good performance in extracting features from two-dimensional images.

According to various embodiments of the present disclosure, in operation 903, the electronic device 100 may extract an image of an object selected by the user as an object of interest from the captured video. When multiple objects of interest are selected, an image of each object of interest may be extracted. The extraction of object images may be performed using a typical image processing algorithms or using a separate trained artificial neural network.

According to various embodiments of the present disclosure, in operation 904, the electronic device 100 may determine whether all the objects of interest selected by the user are objects of interest selected in the past or objects of interest newly selected. As a result of the determination, when there are no newly selected objects of interest (904—No), in operation 913, the frequency of each of the objects of interest selected by the user may be increased by one. Meanwhile, when there are newly selected objects of interest (904—Yes), operations for calculating the number of images (frequency) containing the object of interest from images or videos stored in memory may be performed.

According to various embodiments of the present disclosure, when there are newly selected objects of interest, in operation 905, the electronic device 100 learns an artificial neural network model generated in operation 901 through supervised learning using images of the objects of interest extracted in operation 903 as training data, thereby obtaining an image learning model. According to an embodiment of the present disclosure, when there is an image learning model generated in the past, the existing image learning model may be updated using only the images of the newly selected objects of interest as the training data. According to an embodiment, an image of an object of interest may be subject to preprocessing for adjusting the size, angle of view of the object, and brightness of the image, and then be input as training data to the artificial neural network model. The image learning model acquired in operation 905 may perform a classification operation to determine which object of interest has image features similar to those of the input data.

According to various embodiments of the present disclosure, in operation 907, the electronic device 100 may extract an object image from images or videos stored in the memory 170. In operation 909, the electronic device 100 may input the object image extracted in operation 907 into the image learning model to be classified into each of the objects of interest.

According to various embodiments of the present disclosure, in operation 911, the electronic device 100 may calculate the frequency for each classified object of interest and set the importance on the basis of the frequency.

According to various embodiments of the present disclosure, a method of operating a device comprises capturing a video, displaying the captured video on the display, obtaining objects of interest from the captured video based on an input; setting an importance value corresponding to at least one object of interest from among the obtained objects of interest, wherein the importance value prioritizes objects of interest, obtaining location information of the at least one object of interest and distributing audio focusing to the at least one object of interest based on the set importance value and the obtained location information.

According to various embodiments, the obtaining the objects of interest from the captured video may include selecting the at least one object of interest based on receiving the input corresponding to the at least one object of interest in the captured video, wherein the input corresponds to a touch input or a mouse click input.

According to various embodiments, the obtaining the objects of interest from the captured video may further include deselecting the at least one object of interest based on receiving a second input corresponding to the at least one object of interest in the captured video, wherein the second input corresponds to a double touch input or a mouse double click input.

According to various embodiments, the setting the importance value may include selecting the at least one object of interest and set the importance value based on receiving the input corresponding to the at least one object of interest in the captured video, wherein the input corresponds to a touch-and-swiping operation or a touching operation held for at least a preset time.

According to various embodiments, the importance value is set based on a frequency of past selections of each of the at least one object of interest.

According to various embodiments, the importance value is set based on a frequency of appearance of the objects of interest in captured videos stored in a memory.

According to various embodiments, the setting of the importance value may further include generating an artificial neural network model for storing image features, extracting images of the objects of interest from the captured video, training the artificial neural network model through supervised learning by using the extracted images of the objects of interest as learning data, extracting object images from the captured videos stored in the memory, and classifying the extracted object images into objects of interest by inputting the extracted object images into the artificial neural network model, wherein the importance value is set based on a frequency of each of the classified objects of interest.

According to various embodiments, the method may further comprise displaying a graphical indicator corresponding to the set importance value together with the display of the captured video.

According to various embodiments, the audio focusing is distributed based on adjusting activity of each of multiple microphones.

According to various embodiments, the method may further comprise applying audio filtering to the at least one object of interest according to a voice feature associated with objects of interest wherein the audio focusing is distributed in consideration of an audio filtering effect.

As described above, the device and method disclosed in the present disclosure may provide automatic audio focusing without user intervention, thereby providing a satisfactory video capturing result.

What is claimed is:

1. A device, comprising:
 a camera configured to capture a video;
 a microphone array composed of multiple microphones;
 a display configured to display the captured video;
 an input unit configured to receive inputs;
 a memory configured to store captured videos; and
 at least one processor configured to:
 cause the display to display the captured video;
 obtain objects of interest from the captured video based on an input received through the input unit;
 set an importance value corresponding to at least one object of interest from among the obtained objects of interest based on a frequency of appearances of the obtained objects of interest in the stored captured videos;
 obtain location information of the at least one object of interest; and
 distribute audio focusing to the at least one object of interest based on the set importance value and the obtained location information, wherein the at least one processor is further configured to:
 generate an artificial neural network model for storing image features;
 extract images of the objects of interest from the captured video;

train the generated artificial neural network model through supervised learning by using the extracted images of the objects of interest as training data;

extract object images from the captured videos stored in the memory; and classify the extracted object images as objects of interest by inputting the extracted object images into the artificial neural network model.

2. The device of claim 1, wherein the at least one processor is further configured to select the at least one object of interest based on receiving, through the input unit, the input corresponding to the at least one object of interest in the captured video, wherein the input corresponds to a touch input or a mouse click input.

3. The device of claim 2, wherein the at least one processor is further configured to deselect the at least one object of interest based on receiving, through the input unit, a second input corresponding to the at least one object of interest in the captured video, wherein the second input corresponds to a double touch input or a mouse double click input.

4. The device of claim 1, wherein the at least one processor is further configured to both select the at least one object of interest and set the importance value based on receiving, through the input unit, the input corresponding to the at least one object of interest object in the captured video, wherein the input corresponds to a touch-and-swiping operation or a touching operation held for at least a preset time.

5. The device of claim 1, wherein the importance value is set based on a frequency of past selections of each of the at least one object of interest.

6. The device of claim 1, wherein the at least one processor is further configured to cause the display to display a graphical indicator corresponding to the set importance value together with the captured video.

7. The device of claim 1, wherein the audio focusing is distributed based on adjusting activity of each of the multiple microphones.

8. The device of claim 1, wherein the at least one processor is further configured to apply audio filtering to the at least one object of interest according to a voice feature associated with objects of interest, wherein the audio focusing is distributed in consideration of an audio filtering effect.

9. A method of operating a device, the method comprising:

capturing a video;

displaying the captured video on the display;

obtaining objects of interest from the captured video based on an input;

setting an importance value corresponding to at least one object of interest from among the obtained objects of interest based on a frequency of appearance of the obtained objects of interest in the captured video stored in a memory, generating an artificial neural network model for storing image features, extracting images of the objects of interest from the captured video, training the generated artificial neural network model through supervised learning by using the extracted images of the objects of interest as training data, extracting object images from the captured videos stored in the memory, and classifying the extracted object images into objects of interest by inputting the extracted object images into the artificial neural network model, wherein the importance value is set based on a frequency of each of the classified objects of interest;

obtaining location information of the at least one object of interest; and distributing audio focusing to the at least one object of interest based on the set importance value and the obtained location information.

10. The method of claim 9, wherein the obtaining the objects of interest from the captured video includes:

selecting the at least one object of interest based on receiving the input corresponding to the at least one object of interest in the captured video, wherein the input corresponds to a touch input or a mouse click input.

11. The method of claim 10, wherein the obtaining the objects of interest from the captured video further includes:

deselecting the at least one object of interest based on receiving a second input corresponding to the at least one object of interest in the captured video, wherein the second input corresponds to a double touch input or a mouse double click input.

12. The method of claim 9, wherein the setting the importance value includes:

selecting the at least one object of interest and set the importance value based on receiving the input corresponding to the at least one object of interest object in the captured video, wherein the input corresponds to a touch-and-swiping operation or a touching operation held for at least a preset time.

13. The method of claim 9, wherein the importance value is set based on a frequency of past selections of each of the at least one object of interest.

14. The method of claim 9, further comprising:

displaying a graphical indicator corresponding to the set importance value together with the display of the captured video.

15. The method of claim 9, wherein the audio focusing is distributed based on adjusting activity of each of multiple microphones.

16. The method of claim 9, further comprising:

applying audio filtering to the at least one object of interest according to a voice feature associated with objects of interest wherein the audio focusing is distributed in consideration of an audio filtering effect.

* * * * *